United States Patent
Pandey et al.

(10) Patent No.: US 11,893,004 B2
(45) Date of Patent: Feb. 6, 2024

(54) ANOMALY DETECTION IN MULTIDIMENSIONAL SENSOR DATA

(71) Applicant: Ford Global Technologies, LLC, Dearborn, MI (US)

(72) Inventors: Gaurav Pandey, College Station, TX (US); Brian George Buss, Ypsilanti, MI (US); Dimitar Petrov Filev, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 769 days.

(21) Appl. No.: 17/003,088

(22) Filed: Aug. 26, 2020

(65) Prior Publication Data
US 2022/0067020 A1 Mar. 3, 2022

(51) Int. Cl.
*G06F 16/23* (2019.01)
*G06F 17/16* (2006.01)
(Continued)

(52) U.S. Cl.
CPC ......... *G06F 16/2365* (2019.01); *G01D 3/032* (2013.01); *G05D 1/0088* (2013.01);
(Continued)

(58) Field of Classification Search
CPC ... G06F 16/2365; G06F 17/16; G05D 1/0088; G05D 1/0223; G05D 1/0246;
(Continued)

(56) References Cited

U.S. PATENT DOCUMENTS

| 6,985,215 B2 | 1/2006 | Oh et al. |
| 7,328,126 B2 | 2/2008 | Chamness |

(Continued)

FOREIGN PATENT DOCUMENTS

| DE | 102020102426 A1 * | 9/2020 | ........... G05D 1/0088 |
| FR | 3028031 A1 * | 5/2016 | ............. G01C 21/16 |

(Continued)

OTHER PUBLICATIONS

Mosavi, et al.; Identifying damage locations under ambient vibrations utilizing vector autoregressive models and Mahalanobis distances; Jan. 2012, Mechanical Systems and Signal Processing; vol. 26, pp. 254-267; https://doi.org/10.1016/j.ymssp.2011.06.009 (Year: 2012).*

(Continued)

*Primary Examiner* — Atul Trivedi
(74) *Attorney, Agent, or Firm* — Frank A. MacKenzie; Bejin Bieneman PLC

(57) ABSTRACT

A computer includes a processor and a memory storing instructions executable by the processor to receive a time series of vectors from a sensor, determine a weighted moving mean of the vectors, determine an inverse covariance matrix of the vectors, receive a current vector from the sensor, determine a squared Mahalanobis distance between the current vector and the weighted moving mean, and output an indicator of an anomaly with the sensor in response to the squared Mahalanobis distance exceeding a threshold. The squared Mahalanobis distance is determined by using the inverse covariance matrix.

20 Claims, 4 Drawing Sheets

(51) Int. Cl.
*G05D 1/02* (2020.01)
*G05D 1/00* (2006.01)
*G01D 3/032* (2006.01)

(52) U.S. Cl.
CPC ........... *G05D 1/0223* (2013.01); *G06F 17/16* (2013.01); *G05D 1/027* (2013.01); *G05D 1/0246* (2013.01); *G05D 1/0257* (2013.01); *G05D 1/0278* (2013.01); *G05D 2201/0213* (2013.01)

(58) Field of Classification Search
CPC .... G05D 1/0257; G05D 1/027; G05D 1/0278; G05D 2201/0213; G01S 13/931; G01S 17/89; G01S 17/931; G01C 21/00; B64F 1/362; B60L 58/10; B60L 58/24; B60L 53/18; B60L 2200/10; B64D 45/00; H01M 10/44; H01M 2220/20; B64C 29/0008
USPC ......................................................... 701/534
See application file for complete search history.

(56) References Cited

U.S. PATENT DOCUMENTS

| | | | |
|---|---|---|---|
| 7,406,653 | B2 | 7/2008 | Ide et al. |
| 9,098,753 | B1 * | 8/2015 | Zhu ...................... G05D 1/0246 |
| 10,410,135 | B2 | 9/2019 | Shumpert |
| 11,656,629 | B1 * | 5/2023 | Armstrong-Crews ...................... G01S 17/87 701/25 |
| 2011/0316980 | A1 * | 12/2011 | Dubbelman ......... G06V 10/757 348/47 |
| 2015/0304634 | A1 * | 10/2015 | Karvounis ........ G06F 18/21355 348/46 |
| 2016/0314097 | A1 * | 10/2016 | Bradford .................. G01D 1/16 |
| 2019/0138000 | A1 * | 5/2019 | Hammond ............ B60W 30/00 |
| 2019/0378282 | A1 * | 12/2019 | Rogan ..................... G06T 7/251 |
| 2020/0137580 | A1 * | 4/2020 | Yang ................... H04W 12/009 |
| 2020/0307561 | A1 * | 10/2020 | Bush .................... G05D 1/0221 |
| 2020/0369296 | A1 * | 11/2020 | Kim .................... B60W 30/095 |
| 2021/0072770 | A1 * | 3/2021 | Kwon ................. G05D 1/0094 |
| 2022/0405513 | A1 * | 12/2022 | Radha ................... B60W 50/00 |
| 2023/0103178 | A1 * | 3/2023 | Li ......................... G01S 13/726 701/23 |
| 2023/0186549 | A1 * | 6/2023 | Yang ........................ G06T 7/70 345/419 |

FOREIGN PATENT DOCUMENTS

| | | | | |
|---|---|---|---|---|
| KR | 20220139853 A | * | 10/2022 | ........... G06N 3/0454 |
| WO | WO-2013124292 A1 | * | 8/2013 | ............... G01S 1/08 |
| WO | WO-2023278105 A1 | * | 1/2023 | ........... G05D 1/0219 |

OTHER PUBLICATIONS

Angelov et al., "An Extended Version of the GustafsonKessel Algorithm for Evolving Data Stream Clustering", https://ieeexplore.ieee.org/document/5487884/authors.

Quist et al., "Radar odometry with recursive-RANSAC", Abstract Only, IEEE Transactions on Aerospace and Electronic Systems ( vol. 52 , Issue: 4 , Aug. 2016 ), https://ieeexplore.ieee.org/document/7738343.

Scaramuzza et al., "Appearance-Guided Monocular Omnidirectional Visual Odometry for Outdoor Ground Vehicles", IEEE Transactions on Robotics, vol. 24, No. 5, Oct. 2008.

Ye et al., "Scalable Chi-Square Distance versus Conventional Statistical Distance for Process Monitoring with Uncorrelated Data Variables", Abstract Only, Nov. 20, 2003, https://doi.org/10.1002/qre.539.

Zhang et al., "LOAM: Lidar Odometry and Mapping in Real-time", Robotics Science and Systems (RSS) (2010).

Stellato et al., "Multivariate Chebyshev Inequality With Estimated Mean and Variance", pp. 123-127 |, Accepted author version posted online: May 31, 2016, Published online:Jul. 6, 2017, https://doi.org/10.1080/00031305.2016.1186559.

* cited by examiner

ANOMALY DETECTION IN MULTIDIMENSIONAL SENSOR DATA

BACKGROUND

Vehicles can be autonomous or semi-autonomous. A vehicle computer can be programmed to operate a vehicle independently of the intervention of a human driver, completely or to a lesser degree. The vehicle computer may be programmed to operate the propulsion, brake system, steering system, and/or other vehicle systems based on data from sensors mounted on the vehicle. For the purposes of this disclosure, autonomous operation means the computer controls the propulsion, brake system, and steering system without input from a human driver; semi-autonomous operation means the computer controls one or two of the propulsion, brake system, and steering system (or splits control with a human driver) and the human driver controls the remainder; and nonautonomous operation means a human driver controls the propulsion, brake system, and steering system.

The sensors provide data for the vehicle computer to autonomously or semi-autonomously operate the vehicle. The sensors may provide data about operation of the vehicle, for example, wheel speed, wheel orientation, and engine and transmission data (e.g., temperature, fuel consumption, etc.). The sensors may detect the location and/or orientation of the vehicle. For example, the sensors may include global positioning system (GPS) sensors; accelerometers such as piezoelectric or microelectromechanical systems (MEMS); gyroscopes such as rate, ring laser, or fiber-optic gyroscopes; inertial measurements units (IMU); and magnetometers. The sensors may detect the external world, e.g., objects and/or characteristics of surroundings of the vehicle, such as other vehicles, road lane markings, traffic lights and/or signs, pedestrians, etc. For example, the sensors may include radar sensors, scanning laser range finders, light detection and ranging (LIDAR) devices, and image processing sensors such as cameras. The sensors may include communications devices, for example, vehicle-to-infrastructure (V2I) or vehicle-to-vehicle (V2V) devices.

Data from vehicle sensors can include errors or anomalies. Undetected anomalies can indicate a sensor fault and/or a sudden change to a physical system including the sensor (e.g., wheel slip for wheel-speed sensors), which can impair vehicle operation. Methods for detecting anomalies in multidimensional time-series data are limited and are generally computationally inefficient and/or may lag behind the data. Thus, those methods may be difficult or impractical to implement on a vehicle computer in real time.

DETAILED DESCRIPTION

Figure 1:
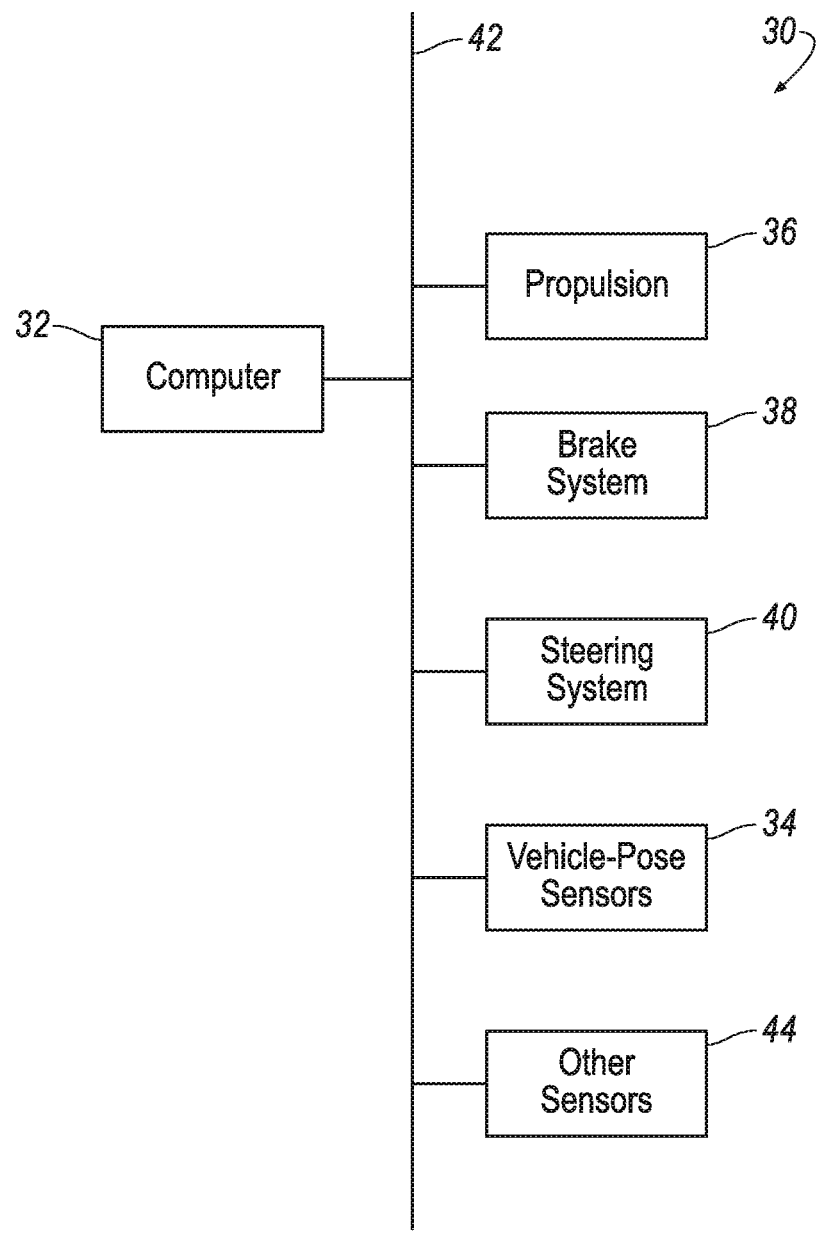
FIG. 1 is a block diagram of an example vehicle.

Sensors such as global positioning system (GPS) sensors, accelerometers, gyroscopes, inertial measurement units (IMUs), radar, lidar, and image sensors provide multidimensional time-series data. Disclosed herein are computationally efficient techniques for detecting anomalies in multidimensional time-series data, i.e., data that is a time series of vectors. Present techniques particularly enhance sensor data fusion, i.e., combining data from multiple sensors to create a unified model of the environment and of a vehicle with respect to the environment. Sensor data fusion is more accurate with anomalous data screened out rather than included, and an autonomous or semi-autonomous vehicle can operate with a more reliable picture of the environment with more accurate sensor fusion. Existing anomaly detection can require buffering of sensor data to implement, meaning that the anomaly detection is lagging the sensor data, whereas anomaly detection described herein is more computationally efficient than other techniques for detecting anomalies in multidimensional time-series data, and with this increased efficiency a vehicle computer can detect anomalies more quickly than with other techniques, typically, and advantageously, in real time.

A computer includes a processor and a memory storing instructions executable by the processor to receive a time series of vectors from a sensor, determine a weighted moving mean of the vectors, determine an inverse covariance matrix of the vectors, receive a current vector from the sensor, determine a squared Mahalanobis distance between the current vector and the weighted moving mean, and output an indicator of an anomaly with the sensor in response to the squared Mahalanobis distance exceeding a threshold. The squared Mahalanobis distance is determined by using the inverse covariance matrix.

The sensor may be a first sensor, and the instructions may further include to run a Kalman filter on vectors from a plurality of sensors including the first sensor, and to prevent the Kalman filter from receiving the vectors from the first sensor in response to outputting the indicator of the anomaly. Running the Kalman filter may include, when the Kalman filter is prevented from receiving the vectors from the first sensor, performing an iteration of the Kalman filter with a prediction step and without a measurement step.

The vectors may describe at least one of motion, position, and orientation of a vehicle including the sensor relative to an external environment. The instructions may further include to operate at least one of a propulsion, brake system, or steering system of the vehicle based on an output of the Kalman filter.

The inverse covariance matrix may be weighted favoring recency of the vectors. The inverse covariance matrix may include exponentially decreasing weights.

The weighted moving mean may include exponentially decreasing weights.

The sensor may be one of a global positioning system sensor, an accelerometer, a gyroscope, a radar, a camera, or a LIDAR.

The threshold may be a value chosen from a chi-square distribution.

A method includes receiving a time series of vectors from a sensor, determining a weighted moving mean of the vectors, determining an inverse covariance matrix of the vectors, receiving a current vector from the sensor, determining a squared Mahalanobis distance between the current vector and the weighted moving mean, and outputting an indicator of an anomaly with the sensor in response to the squared Mahalanobis distance exceeding a threshold. The squared Mahalanobis distance may be determined by using the inverse covariance matrix.

The sensor may be a first sensor, and the method may further include running a Kalman filter on vectors from a plurality of sensors including the first sensor, and preventing the Kalman filter from receiving the vectors from the first sensor in response to outputting the indicator of the anomaly. Running the Kalman filter may include, when the Kalman filter is prevented from receiving the vectors from the first sensor, performing an iteration of the Kalman filter with a prediction step and without a measurement step.

The vectors may describe at least one of motion, position, and orientation of a vehicle including the sensor relative to an external environment. The method may further include operating at least one of a propulsion, brake system, and steering system of the vehicle based on an output of the Kalman filter.

The inverse covariance matrix is weighted favoring recency of the vectors. The inverse covariance matrix may include exponentially decreasing weights.

The weighted moving mean may include exponentially decreasing weights. The sensor may be one of a global positioning system sensor, an accelerometer, a gyroscope, a radar, a camera, or a LIDAR. The threshold may be a value chosen from a chi-square distribution.

A computer 32 includes a processor and a memory storing instructions executable by the processor to receive a time series of vectors from one multidimensional sensor 34 of a plurality of multidimensional sensors 34 of a vehicle 30, determine a weighted moving mean of the vectors, determine an inverse covariance matrix of the vectors, receive a current vector from the multidimensional sensor 34, determine a squared Mahalanobis distance between the current vector and the weighted moving mean, and output an indicator of an anomaly with the multidimensional sensor 34 in response to the squared Mahalanobis distance exceeding a threshold. The squared Mahalanobis distance is determined by using the inverse covariance matrix.

With reference to FIG. 1, the vehicle 30 may be any passenger or commercial automobile such as a car, a truck, a sport utility vehicle, a crossover, a van, a minivan, a taxi, a bus, etc.

The vehicle 30 may be an autonomous or semi-autonomous vehicle. That is, the computer 32 can be programmed to operate the vehicle 30 independently of the intervention of a human driver, completely or to a lesser degree. The computer 32 may be programmed to operate a propulsion 36, a brake system 38, a steering system 40, and/or other vehicle systems based on data from sensors 34, 44 including the multidimensional sensors 34. For the purposes of this disclosure, autonomous operation means the computer 32 controls the propulsion 36, brake system 38, and steering system 40 without input from a human driver; semi-autonomous operation means the computer 32 controls one or two of the propulsion 36, brake system 38, and steering system 40 (or splits control with a human driver) and the human driver controls the remainder; and nonautonomous operation means a human driver controls the propulsion 36, brake system 38, and steering system 40.

The computer 32 is a microprocessor-based computing device, e.g., an electronic controller or the like. The computer 32 can include a processor, a memory, etc. The memory of the computer 32 includes media for storing instructions executable by the processor as well as for electronically storing data and/or databases. The computer 32 can be multiple computers coupled together. Further, the computer 32 may include one or more dedicated electronic circuits including an ASIC that is manufactured for a particular operation, e.g., an ASIC for processing sensor data and/or communicating the sensor data. In another example, the computer 32 may include an FPGA which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in the computer 32.

The computer 32 may transmit and receive data through a communications network 42 such as a controller area network (CAN) bus, Ethernet, WiFi, Local Interconnect Network (LIN), onboard diagnostics connector (OBD-II), and/or by any other wired or wireless communications network. The computer 32 may be communicatively coupled to the propulsion 36, the brake system 38, the steering system 40, the sensors 34, 44, and other components via the communications network 42.

The propulsion 36 of the vehicle 30 generates energy and translates the energy into motion of the vehicle 30. The propulsion 36 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion 36 can include an electronic control unit (ECU) or the like that is in communication with and receives input from the computer 32 and/or a human driver. The human driver may control the propulsion 36 via, e.g., an accelerator pedal and/or a gear-shift lever.

The brake system 38 is typically a conventional vehicle braking subsystem and resists the motion of the vehicle 30 to thereby slow and/or stop the vehicle 30. The brake system 38 may include friction brakes such as disc brakes, drum brakes, band brakes, etc.; regenerative brakes; any other suitable type of brakes; or a combination. The brake system 38 can include an electronic control unit (ECU) or the like that is in communication with and receives input from the computer 32 and/or a human driver. The human driver may control the brake system 38 via, e.g., a brake pedal.

The steering system 40 is typically a conventional vehicle steering subsystem and controls the turning of the wheels. The steering system 40 may be a rack-and-pinion system with electric power-assisted steering, a steer-by-wire system, as both are known, or any other suitable system. The steering system 40 can include an electronic control unit (ECU) or the like that is in communication with and receives input from the computer 32 and/or a human driver. The human driver may control the steering system 40 via, e.g., a steering wheel.

The sensors 34, 44 include the multidimensional sensors 34 and other sensors 44. A "multidimensional sensor" is a sensor that returns data as a time series of vectors, possibly after preprocessing (described below). The other sensors 44 can return data as a time series of scalar values or in some other form. For example, the other sensors 44 may provide data about operation of the vehicle 30, for example, wheel speed, wheel orientation, and engine and transmission data (e.g., temperature, fuel consumption, etc.).

Figure 2:
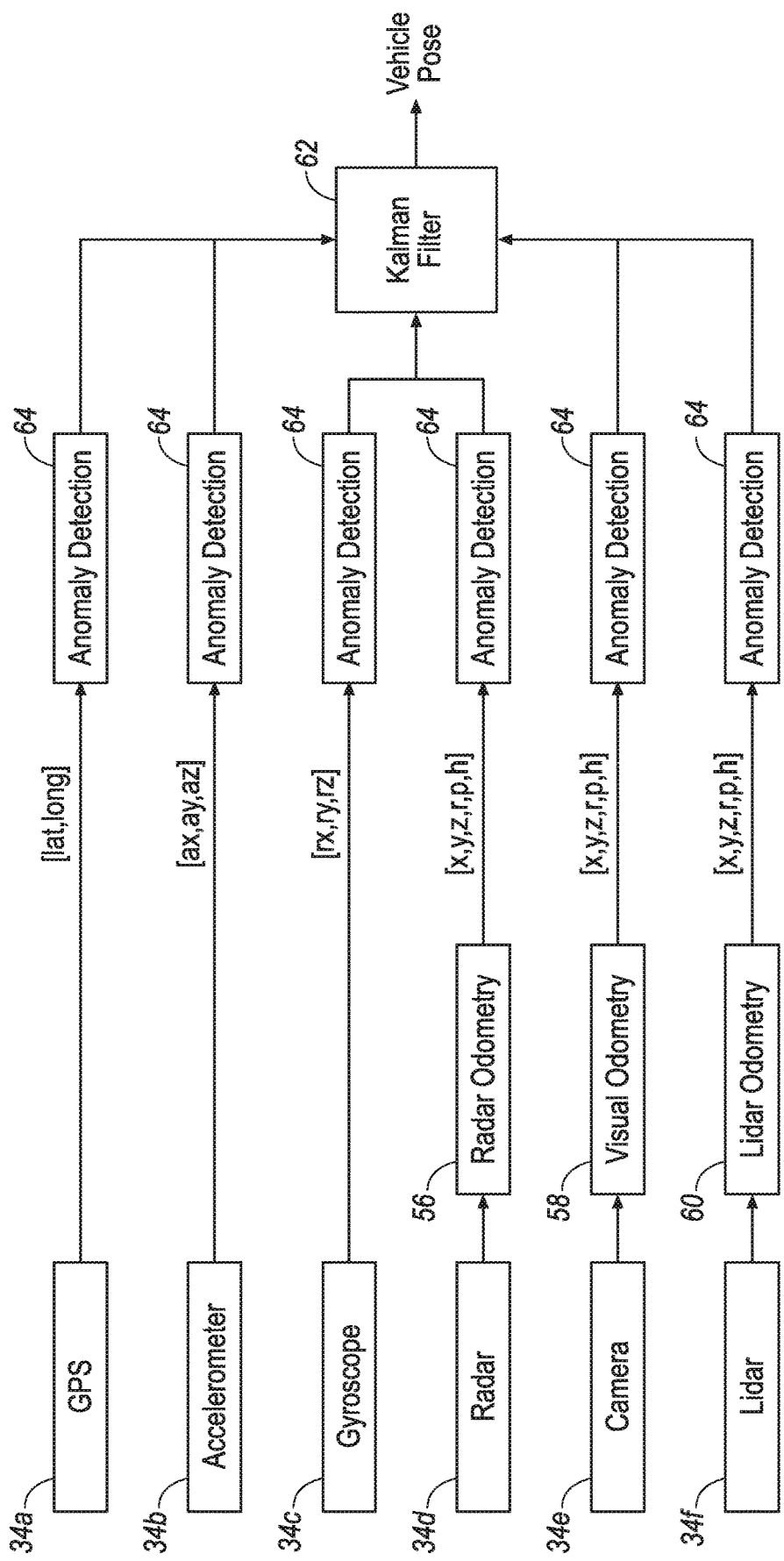
FIG. 2 is a block diagram of data flow in the vehicle.

With reference to FIG. 2, at least some of the multidimensional sensors 34 can provide data related to the vehicle pose. For the purposes of this disclosure, "vehicle pose" is a description of the vehicle 30 in space, for example, position and orientation of the vehicle 30 in six degrees of freedom, x, y, z, roll, pitch, yaw; for another example, motion of the vehicle 30 in six degrees of freedom. The multidimensional sensors 34 used for the process 400 below can include at least one global positioning system (GPS) sensor 34a, at least one accelerometer 34b, at least one gyroscope 34c, at least one radar 34d, at least one light detection and ranging (LIDAR) 34e, and at least one camera 34f. The multidimensional sensors 34 may detect the location and/or orientation of the vehicle 30. For example, the multidimensional sensors 34 may include the GPS sensor 34a; the accelerometer 34b such as piezo-electric or micro-electromechanical systems (MEMS); the gyroscope 34c such as rate, ring laser, or fiber-optic gyroscopes; inertial measurements units (IMU); and/or magnetometers. The multidimensional sensors 34 may detect the external world, e.g., objects and/or characteristics of surroundings of the vehicle 30, such as other vehicles, road lane markings, traffic lights and/or signs, pedestrians, etc. For example, the multidimensional sensors 34 may include the radars 34d, scanning laser range finders, the LIDAR 34e, and at least one image processing sensor such as the camera 34f. The multidimensional sensors 34 provide data about the vehicle pose in the form of a time series of vectors, either directly or after preprocessing (described below). For the purposes of this disclosure, a "time series" is a set of data issued sequentially over time. The time interval can be different for each multidimensional sensor 34.

A "vector" is an ordered set of values. Vectors included in sensor data can describe at least one of motion, position, and orientation of the vehicle 30 relative to an external environment. For example, each GPS sensor 34a provides a 2-dimensional vector (latitude, longitude) at each time interval. Each accelerometer 34b provides a 3-dimensional acceleration vector ($a_x$, $a_y$, $a_z$) at each time interval. Each gyroscope 34c provides an angular velocity vector ($r_x$, $r_y$, $r_z$) at each time interval. After preprocessing, each radar 34d, camera 34f, and LIDAR 34e provides a position and orientation vector (x, y, z, r, p, h).

"Preprocessing" data from the sensors 34, 44 means applying a transformation or algorithm to raw data from a sensor 34, 44 to make that data suitable for some purpose. Some of the multidimensional sensors 34 may require preprocessing, and others of the multidimensional sensors 34 may not require preprocessing. For example, typically the GPS sensors 34a, accelerometers 34b, and gyroscopes 34c do not require preprocessing, and the radars 34d, cameras 34f, and LIDARs 34e do require preprocessing. For example, the preprocessing for the radars 34d can be radar odometry 56, preprocessing for the cameras 34f can be visual odometry 58, and preprocessing for the LIDARs 34e can be LIDAR odometry 60. Odometry blocks 56, 58, 60 determine the position and/or orientation of a multidimensional sensor 34 based on the data received from that multidimensional sensor 34. The blocks 56, 58, 60 can operate according to conventional odometry techniques. For example, one technique for performing visual odometry 58 is applying feature detection to input images; constructing an optical flow field using the corresponding features from consecutive images, such as with the Lucas-Kanade method; and estimating motion of the camera 34f from the optical flow field using, e.g., a Kalman filter or a cost function of reprojection error between consecutive images. Other techniques exist for visual odometry 58, and likewise for radar odometry 56 and LIDAR odometry 60, e.g., D. Scaramuzza and R. Siegwart, *Appearance-guided monocular omnidirectional visual odometry for outdoor ground vehicles,* 24 IEEE transactions on robotics 1015-26 (2008); Ji Zhang and Sanjiv Singh, *LOAM: Lidar Odometry and Mapping in Real-time,* Robotics Science and Systems (RSS) (2010); E. B. Quist, P. C. Niedfeldt and R. W. Beard, *Radar odometry with recursive-RANSAC,* 52:4 IEEE Transactions on Aerospace and Electronic Systems 1618-30 (August 2016).

Figure 4:
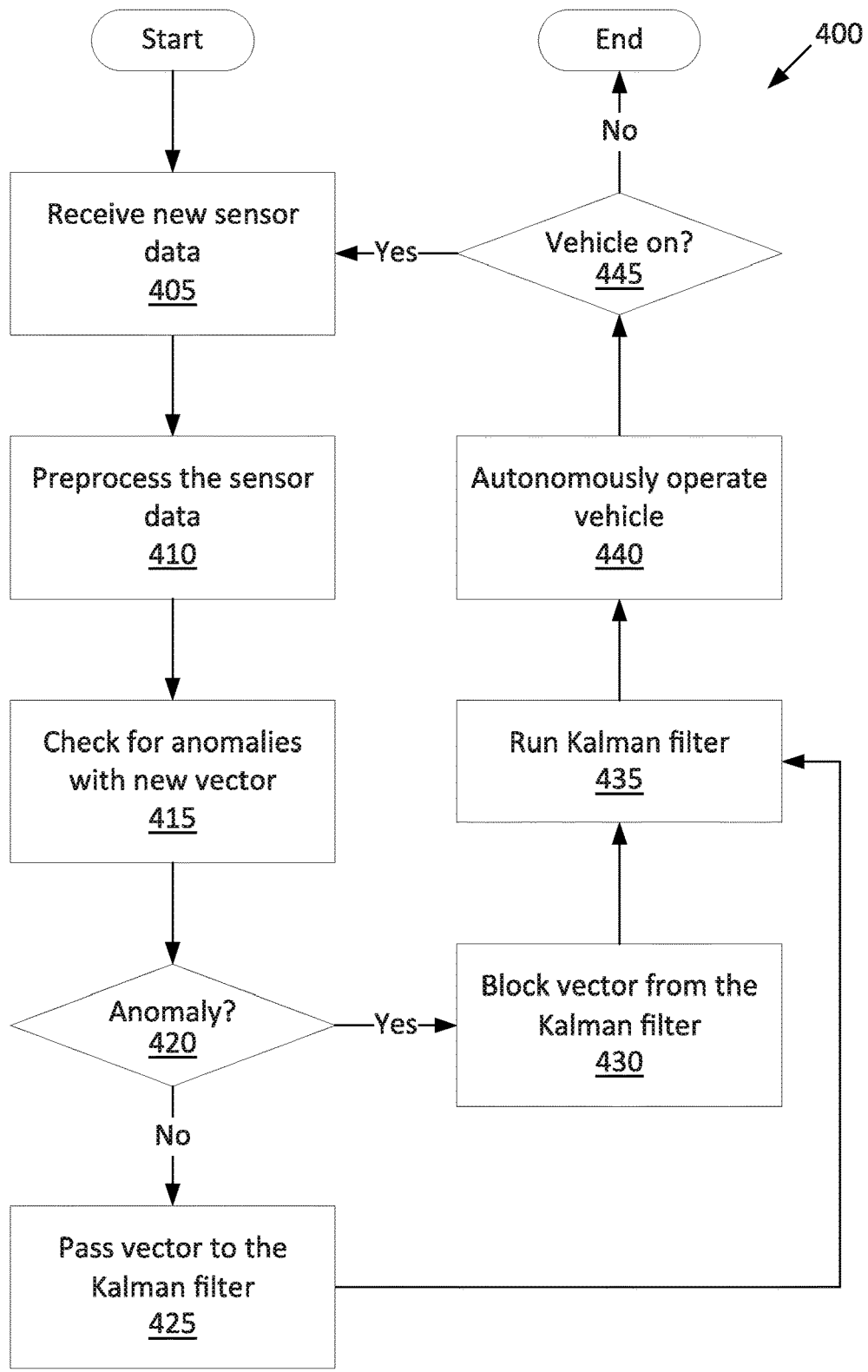
FIG. 4 is a process flow diagram of an example process for processing data to pass through a Kalman filter for operating the vehicle.

With continued reference to FIG. 2, the vehicle pose is outputted by the computer 32 executing a Kalman filter 62 that receives vectors from the multidimensional sensors 34. FIG. 4 illustrates a process 400 for determining the vehicle pose and operating the vehicle 30 accordingly, and FIG. 2 illustrates the flow of data that occurs during the process 400. Each multidimensional sensor 34 outputs a time series of vectors, some after performing odometry on the data from that multidimensional sensor 34. For each multidimensional sensor 34, anomaly detection 64 is used to either block vectors from the multidimensional sensor 34 if an anomaly is detected or pass along the vectors from the multidimensional sensor 34 if no anomaly is detected. For the purposes of this disclosure, an "anomaly" in sensor data is a change that is more likely due to a problem occurring with or to the multidimensional sensor 34, i.e., a fault, defect, or impairment of the sensor 34 or a physical change to what is being measured by the sensor 34, than to noise. A process 300 for anomaly detection 64 is described below. The Kalman filter 62 thus determines the vehicle pose using only data from the multidimensional sensors 34 for which no anomaly was detected.

Figure 3:
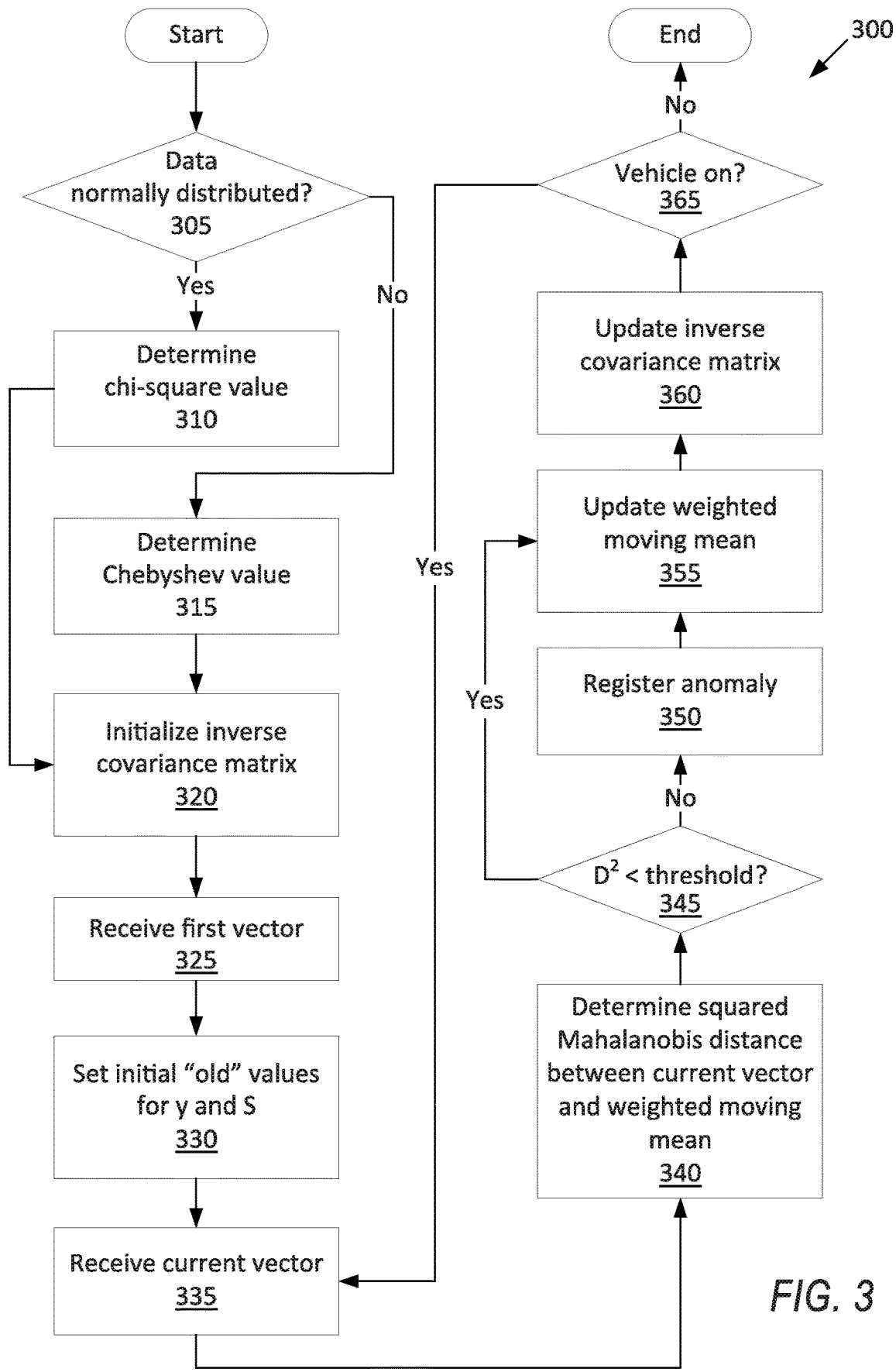
FIG. 3 is a process flow diagram of an example process for detecting anomalies in data from a sensor of the vehicle.

FIG. 3 is a process flow diagram illustrating an exemplary process 300 for detecting anomalies in data from one of the multidimensional sensors 34. The memory of the computer 32 stores executable instructions for performing the steps of the process 300. The computer 32 executes the process 300 independently for each sensor 34 for which the process 300 can be executed. At the start of the process 300, the computer 32 chooses a threshold value $\chi_{n,\beta}^2$ or $\lambda_{n,\beta}^2$, determines an initial inverse covariance matrix $S_0^{-1}$, receives a first vector $z_1$ from the multidimensional sensor 34, and sets the initial previous values for the weighted moving mean of the vector $z^*_{old}$ and the inverse covariance matrix $S_{old}^{-1}$. Then for as long as the vehicle 30 is on, the computer 32 cycles through steps of receiving the current vector $z_k$ from the multidimensional sensor 34, determining a squared Mahalanobis distance $D^2$ between the current vector $z_k$ and a weighted moving mean of the previous vectors $z^*_{old}$, outputting an indicator of an anomaly if the squared Mahalanobis distance $D^2$ is greater than the threshold $\chi_{n,\beta}^2$ or $\lambda_{n,\beta}^2$, updating the weighted moving mean $z^*_{new}$ of the previous vectors to include the current vector $z_k$, and updating a weighted inverse covariance matrix $S_{new}^{-1}$ with the current vector $z_k$. The computer 32 cycles through the steps at a refresh speed of the multidimensional sensor 34, which can be different for different types of the multidimensional sensors 34.

The process 300 begins in a decision block 305, in which the computer 32 determines whether the vector z is normally distributed (sometimes referred to as Gaussian). For example, the memory of the computer 32 can store an indicator for each of the multidimensional sensors 34 indicating whether data from that multidimensional sensor 34 are normally distributed. Whether each multidimensional sensor 34 produces normally distributed can be determined experimentally. If the vector z from the multidimensional sensor 34 is normally distributed, the process 300 proceeds to a block 310 to choose a threshold value $\chi_{n,\beta}^2$. If the vector z is not normally distributed or has an unknown distribution, the process 300 proceeds to a block 315 to choose a threshold value $\lambda_{n,\beta}^2$.

In the block 310, in the case of the vector z being normally distributed, the threshold value $\chi_{n,\beta}^2$ is chosen from a chi-squared distribution with n degrees of freedom and a p-value of β. The number of degrees of freedom n is equal to a length of the vector z, i.e., a number of elements of the vector z, that is generated by the multidimensional sensor 34. For example, the degrees of freedom n for the GPS sensor 34a is 2, and the degrees of freedom n for the camera 34f is 6. The value β is chosen based on empirically determining the variability, i.e., noise, of the data from the sensor multidimensional 34. For a sensor 34 with greater noise, the value β and thus the threshold value will be higher, meaning that a greater deviation is needed to classify the deviation as an anomaly. The chi-squared distribution is a known statistical distribution, so once the degrees of freedom n and the value β are known, the threshold value $\chi_{n,\beta}^2$ is determined, for example, by looking up in a statistical table. After the block 310, the process 300 proceeds to a block 320.

In the block 315, in the case of the vector z being nonnormal or unknown, the threshold value $\lambda_{n,\beta}^2$ is based on Chebyshev's Inequality. The degrees of freedom n and the value β have the same meaning as for the chi-squared distribution. Chebyshev's Inequality is a known statistical relationship, so once the degrees of freedom n and the value β are known, the threshold value $\lambda_{n,\beta}^2$ is determined, for example, by looking up in a statistical table. For a given n and β, the threshold value $\chi_{n,\beta}^2$ is tighter, i.e., more difficult to satisfy, than the threshold value $\lambda_{n,\beta}^2$ is. For example, if n=2 and β=0.0455, the threshold value χhd n,β² equals 6.18, and the threshold value $\lambda_{n,\beta}^2$ equals 43.96. After the block 315, the process 300 proceeds to the block 320.

Next, in a block 320, the computer 32 initializes the inverse covariance matrix as $S_0^{-1}=\gamma I$, in which S is the covariance matrix, I is an n×n identity matrix, n is a length (number of elements) of the vector z, and γ is an initial value for the inverse variances, i.e., for the elements of $S^{-1}$ along the diagonal. The value γ may be chosen to be sufficiently large that the first calculation of the squared Mahalanobis distance $D^2$ in a block 340 below is necessarily greater than the threshold value $\chi_{n,\beta}^2$ or $\lambda_{n,\beta}^2$ so that measurements are initially rejected until confidence is established in them. Alternatively, the value γ may be chosen to be sufficiently large that the first calculation of the squared Mahalanobis distance $D^2$ in a block 340 below is necessarily less than the threshold value $\chi_{n,\beta}^2$ or $\lambda_{n,\beta}^2$ so that measurements are initially accepted.

Next, in a block 325, the computer 32 receives a first vector $z_1$ from the time series of vectors z from the multidimensional sensor 34.

Next, in a block 330, the computer 32 sets the initial values for the weighted moving mean $z^*_{old}$ and for the inverse covariance matrix $S_{old}^{-1}$. The asterisk (*) indicate that a variable is an average. The initial value for the weighted moving mean $z^*_{old}$ is the first vector $z_1$, i.e., $z^*_{old}=z_1$. The initial value for the previous inverse covariance matrix $S_{old}^{-1}$ is the initial value for the inverse covariance matrix $S_0^{-1}$, i.e., $S_{old}^{-1}=S_0^{-1}$.

Next, in a block 335, the computer 32 receives a current vector $z_k$ from the time series of vectors z from the multidimensional sensor 34. The index k is 2 the first time that the block 335 is performed and increases by 1 each time thereafter.

Next, in a block 340, the computer 32 determines the squared Mahalanobis distance $D^2$ between the current vector $z_k$ and the weighted moving mean $z^*_{old}$. The squared Mahalanobis distance $D^2$ is determined by using the inverse covariance matrix $S_{old}^{-1}$, initially as determined above in the block 330 and thereafter as determined below in a block 360. The squared Mahalanobis distance $D^2$ is a matrix product of the difference between the current vector $z_k$ and the weighted moving mean $z^*_{old}$, the inverse covariance matrix $S_{old}^{-1}$, and the transpose of the difference between the current vector $z_k$ and the weighted moving mean $z^*_{old}$, i.e., $$D^2=(z_k-z^*_{old})^T S_{old}^{-1}(z_k-z^*_{old})$$

Next, in a decision block 345, the computer 32 determines whether the squared Mahalanobis distance $D^2$ from the block 340 exceeds the threshold value $\chi_{n,\beta}^2$ or $\lambda_{n,\beta}^2$ from the blocks 310 or 315. If the squared Mahalanobis distance $D^2$ is greater than the threshold value $\chi_{n,\beta}^2$ or $\lambda_{n,\beta}^2$, the process 300 proceeds to a block 350. If the squared Mahalanobis distance $D^2$ is less than the threshold value $\chi_{n,\beta}^2$ or $\lambda_{n,\beta}^2$, the process 300 proceeds to a block 355.

In the block 350, the computer 32 outputs an indicator of an anomaly with the multidimensional sensor 34. For example, the computer 32 can set a flag, i.e., a value specifying that an anomaly is detected, in memory for the multidimensional sensor 34. The computer 32 may also display a warning to occupants of the vehicle 30. Alternatively or additionally, the computer 32 may set a diagnostic trouble code (DTC) or the like in the onboard diagnostics system identifying the multidimensional sensor 34 experiencing the anomaly. After the block 350, the process 300 proceeds to the block 355.

In the block 355, the computer 32 updates the previous weighted moving mean $z^*_{old}$ to a new weighted moving mean $z^*_{new}$ including the current vector $z_k$. The new weighted moving mean $z^*_{new}$ is a sum of the current vector $z_k$ weighted by a weight α<1 and the previous weighted moving mean $z^*_{old}$ weighted by 1−α, i.e., $$z^*_{new}=(1-\alpha)z^*_{old}+\alpha z_k$$

The weight α can be different for different sensors 34. For each sensor 34, the weight α is chosen experimentally by executing the process 300 multiple times, each time with a different value for the weight α, and choosing the value for the weight α that provides the most accurate data for that sensor 34. The formula above for the new weighted moving mean $z^*_{new}$ is equivalent to applying exponentially decreasing weights W to the time series of vectors z, i.e., $z^*_{new}=WZ$, in which $$W=[(1-\alpha)^k \alpha(1-\alpha)^{k-1}\alpha(1-\alpha)^{k-2} \ldots \alpha]$$

$$Z=[z_1 z_2 \ldots z_{k-1} z_k]^T$$

Next, in the block 360, the computer 32 updates the previous inverse covariance matrix $S_{old}^{-1}$ to a new inverse covariance matrix $S_{new}^{-1}$, with the current vector $z_k$. The new inverse covariance matrix $S_{new}^{-1}$, follows this formula:

$$S_{new}^{-1} = (I - G(z_k - z^*_{old})^T)S_{old}^{-1}\frac{1}{1-\alpha}$$

in which $$G = S_{old}^{-1}(z_k - z^*_{old})\frac{\alpha}{1-\alpha+\alpha(z_k-z^*_{old})^T S_{old}^{-1}(z_k - z^*_{old})}$$

This formula for the new inverse covariance matrix $S_{new}^{-1}$, is weighted favoring recency of the vectors z, i.e., more recent vectors z are given more weight when calculating the new inverse covariance matrix $S_{new}^{-1}$. In particular, the formula includes exponentially decreasing weights. The formula is recursive and is significantly less computationally intensive than other techniques such as calculating the covariance matrix and then taking the inverse of that covariance matrix. Advantageously, the process 300 never requires directly calculating the covariance matrix $S_{new}$, only the inverse covariance matrix $S_{new}^{-1}$.

Next, in a decision block 365, the computer 32 determines whether the vehicle 30 is still running. If the vehicle 30 is still running, the process 300 returns to the block 335 for another cycle for the next vector $z_{k+1}$ in the time series of sensor data. If the vehicle 30 is no longer running, the process 300 ends.

FIG. 4 is a process flow diagram illustrating the exemplary process 400 for processing data to pass through the Kalman filter 62 for operating the vehicle 30. The memory of the computer 32 stores executable instructions for performing the steps of the process 400. As a general overview of the process 400, the computer 32 cycles through steps of receiving sensor data from one of the multidimensional sensors 34 that has new (i.e., generated by the multidimensional sensor 34 and as-yet unprocessed or preprocessed) data; performing preprocessing on any new data from the radars 34d, cameras 34f, and LIDARs 34e to convert the sensor data to a vector z; checking anomaly detection results for the vector z; passing the vector to the Kalman filter 62 if the multidimensional sensor 34 does not have an anomaly; preventing the vector from reaching the Kalman filter 62 if the multidimensional sensor 34 has an anomaly; running the Kalman filter 62 to determine the vehicle pose x; and autonomously operating the vehicle 30 using the vehicle pose x from the Kalman filter 62. The process 400 cycles as quickly as the rate of the multidimensional sensor 34 that updates most frequently. The process 400 continues as long as the vehicle 30 is on. The process 300 above runs for each of the multidimensional sensors 34 in parallel with one instance of the process 400.

The process 400 begins in a block 405, in which the computer 32 receives sensor data from one of the multidimensional sensors 34 that has new data related to the vehicle pose. Because the process 400 cycles as quickly as the rate of the most frequently updating of the multidimensional sensors 34, at least one of the multidimensional sensors 34 will have new data. If multiple multidimensional sensors 34 have new data, then the process 400 will proceed with data from one of the multidimensional sensors 34 on the current cycle and will proceed with data from another of the multidimensional sensors 34 on the next cycle after returning to this block 405 from a decision block 445. For some of the multidimensional sensors 34, e.g., the GPS sensors 34a, the accelerometers 34b, and the gyroscopes 34c, the sensor data is a current vector $z_k$ in a time series of vectors z, as described above. For the remaining multidimensional sensors 34, i.e., the radars 34d, the cameras 34f, and the LIDARs 34e, the sensor data are radar data, image data, and LIDAR data, respectively.

Next, in a block 410, the computer 32 preprocesses the sensor data that is not in the format of a time series of vectors in order to transform that sensor data into a current vector $z_k$ in a time series of vectors z. For example, the computer 32 applies radar odometry 56 to the radar data from the radars 34d, visual odometry 58 to the image data from the cameras 34f, and LIDAR odometry 60 to the LIDAR data from the LIDARs 34e, as described above. If the new sensor data is from a multidimensional sensor 34 that does not require preprocessing, e.g., the GPS sensor 34a, the accelerometer 34b, or the gyroscope 34c, then the data is already in the form of a vector $z_k$.

Next, in a block 415, the computer 32 checks whether an anomaly has been indicated or flagged in the block 340 of the process 300 above for the multidimensional sensor 34 that returned data in the block 405.

Next, in a decision block 420, if an anomaly was found in the block 415, the process 400 proceeds to a block 430. If no anomaly was found in the block 415, the process 400 proceeds to a block 425.

In the block 425, the computer 32 prevents the Kalman filter 62 from receiving the vector $z_k$.

In the block 430, the computer 32 passes the vector $z_k$ to the Kalman filter 62.

After the block 425 or the block 430, the process 400 proceeds to a block 435. In the block 435, the computer 32 runs the Kalman filter 62 for one iteration, i.e., one time step. (This Kalman filter 62 is separate from the Kalman filter that might be run for preprocessing sensor data, described above.) The Kalman filter 62 works by forming a feedback loop between a prediction step, i.e., predicting the vehicle pose and error estimates for a next time step using prediction equations, and a measurement step, i.e., adjusting the predictions with measurements from the multidimensional sensors 34 using measurement equations. As will be explained in more detail, if the Kalman filter 62 received a vector in the block 425, then running the Kalman filter 62 for an iteration includes performing the prediction step and the measurement step, and if the computer 32 prevented the vector from passing to the Kalman filter 62, running the Kalman filter 62 for an iteration includes performing the prediction step without the measurement step.

The Kalman filter 62 can be an extended Kalman filter. The prediction equations for an extended Kalman filter are:

$$\hat{x}_{k|k-1} = f(\hat{x}_{k-1|k-1}, u_k)$$

$$P_{k|k-1} = F_k P_{k-1|k-1} F_k^T + Q$$

in which x is a vector of length m representing the vehicle pose, the circumflex (^) represents that the variable is an estimate, the subscript i|j indicates the variable at timestep i given information through timestep j≤i, u is a vector of length l representing control inputs, $f(\cdot)$ is a function predicting the current vehicle pose from the previous vehicle pose and the control inputs, P is an m×m matrix of the error covariance of x, F is an m×m Jacobian matrix of the function $f(\cdot)$ the superscript T is the transpose operator, and Q is an m×m matrix of the process noise covariance. For example, the vector x can be $(x_x, x_y, x_z, x_\theta, x_\psi, x_\varphi, v_x, v_y, v_z, v_\theta, v_\psi, v_\varphi, a_x, a_y, a_z, a_\theta, a_\psi, a_\varphi)$, in which x represents spatial or angular position; v represents spatial or angular velocity; a represents spatial or angular acceleration; the subscripts x, y, z represent spatial dimensions; and the subscripts $\theta$, $\psi$, $\varphi$ represent pitch, roll, and yaw, respectively. The function $f(\cdot)$ can be a physics-based model relating the previous vehicle pose x and current control inputs u to the current vehicle pose x in the absence of process noise. The output of function $f(\cdot)$ is a vector of the same length as the vehicle pose x. The vector u includes values for control inputs such as applied acceleration, braking force, and steering angle. The matrix F is this Jacobian:

$$F_k = \frac{\partial f}{\partial x}\bigg|_{\hat{x}_{k-1|k-1}, u_k}$$

Here are the measurement equations:

$$K_k = P_{k|k-1} H_k^T (H_k P_{k|k-1} H_k^T + R)^{-1}$$

$$\hat{x}_{k|k} = \hat{x}_{k|k-1} + K_k(z_k - h(\hat{x}_{k|k-1}))$$

$$P_{k|k} = (I - K_k H_k) P_{k|k-1}$$

in which K is an m×n matrix representing the Kalman gain, H is an n×m Jacobian matrix of the function h(•), h(•) is a function predicting the measurement vector z from the vehicle pose x, R is an n×n matrix of the measurement noise covariance, z is the vector of length n passed to the Kalman filter 62 in the block 425, and I is an m×m identity matrix. The vector z is the vector from one of the multidimensional sensors 34 that was passed to the Kalman filter 62 in the block 425, e.g., if the vector was from the GPS sensor 34a, then z=(latitude, longitude), if the vector was from the LIDAR 34e, then z=($x_L$, $y_L$, $z_L$, $r_L$, $p_L$, $h_L$), in which the variables x, y, z, r, p, h are spatial dimensions and roll, pitch, and yaw; and the subscript L represents the LIDAR 34e. The function h(•) can be a physics-based model predicting the measurement vector z based on the vehicle pose x. The output of the function h(•) is a vector of the same length as the measurement vector z. The matrix H is this Jacobian:

$$H_k = \frac{\partial h}{\partial x} |_{\hat{x}_{k|k-1}}$$

There is a different function h(•) for each of the multidimensional sensors 34, e.g., $h_{GPS}$(•) for the GPS sensor 34a, $h_L$(•) for the LIDAR 34e, etc.

If the vector was prevented from passing to the Kalman filter 62 in the block 430, then running the Kalman filter 62 includes only the prediction step and not the measurement step. The Kalman filter 62 performs the prediction equations above. Rather than performing the measurement equations, the Kalman filter 62 passes the predicted vehicle pose $\hat{x}_{k|k-1}$ and predicted error covariance $P_{k|k-1}$ to the next time step unchanged, i.e., $\hat{x}_{k|k-1}$ becomes $\hat{x}_{k|k}$, and $P_{k|k-1}$ becomes $P_{k|k}$, which will be used in the prediction step in the next time step.

Next, in a block 440, the computer 32 autonomously or semi-autonomously operates the vehicle 30, i.e., operates at least one of the propulsion 36, the brake system 38, and the steering system 40, based on the vehicle pose x from the Kalman filter 62. For example, the vehicle pose x can be an input to a path-planning algorithm, as is known. The vehicle pose x is the current state of the vehicle 30, and the path-planning algorithm uses the vehicle pose x to determine what path the vehicle 30 will follow from that current state. The path-planning algorithm is then used to generate instructions for the propulsion 36, the brake system 38, and the steering system 40. For another example, the vehicle pose x can be an input to an antilock-brake system (ABS), a lane-centering system, etc. The ABS can use the vehicle pose x (or part of the vehicle pose x such as velocity) when deciding whether to activate and thereby operate the brake system 38. The lane-centering system can use the vehicle pose x (or part of the vehicle pose x such as position) when deciding whether to activate and thereby control the steering system 40. Because the vehicle pose x described herein is based on sensor data with anomalies filtered out, the vehicle pose x is more accurate or is known with greater confidence (i.e., less uncertainty) in real time, meaning that the path-planning algorithm, ABS, lane-centering system, etc. can also be used with greater accuracy or confidence.

Next, in a decision block 445, the computer 32 determines whether the vehicle 30 is still running. If the vehicle 30 is still running, the process 400 returns to the block 405 for another cycle for the next batch of new sensor data. If the vehicle 30 is no longer running, the process 400 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The disclosure has been described in an illustrative manner, and it is to be understood that the terminology which has been used is intended to be in the nature of words of description rather than of limitation. Use of "in response to" and "upon determining" indicates a causal relationship, not merely a temporal relationship. The adjective "first" is used throughout this document as an identifier and is not intended to signify importance, order, or quantity. Many modifications and variations of the present disclosure are possible in light of the above teachings, and the disclosure may be practiced otherwise than as specifically described.

What is claimed is:

1. A computer comprising a processor and a memory storing instructions executable by the processor to:
receive a time series of vectors from a sensor of a vehicle;
determine a weighted moving mean of the vectors over at least a portion of the time series;
determine an inverse covariance matrix of the vectors;
receive a current vector from the sensor;
determine a squared Mahalanobis distance between the current vector and the weighted moving mean, wherein the squared Mahalanobis distance is determined by using the inverse covariance matrix;
output an indicator of an anomaly with the sensor in response to the squared Mahalanobis distance exceeding a threshold; and
operate the vehicle based on the time series of vectors without the indicator of the anomaly and not based on the time series of vectors with the indicator of the anomaly.

2. The computer of claim 1, wherein
the sensor is a first sensor; and
the instructions further include to run a Kalman filter on vectors from a plurality of sensors including the first sensor, and to prevent the Kalman filter from receiving the vectors from the first sensor in response to outputting the indicator of the anomaly.

3. The computer of claim 2, wherein running the Kalman filter includes, when the Kalman filter is prevented from receiving the vectors from the first sensor, performing an iteration of the Kalman filter with a prediction step and without a measurement step.

4. The computer of claim 2, wherein the vectors describe at least one of motion, position, and orientation of the vehicle relative to an external environment.

5. The computer of claim 4, wherein the instructions further include to operate at least one of a propulsion, brake system, or steering system of the vehicle based on an output of the Kalman filter.

6. The computer of claim 1, wherein the inverse covariance matrix is weighted favoring recency of the vectors.

7. The computer of claim 6, wherein the inverse covariance matrix includes exponentially decreasing weights.

8. The computer of claim 1, wherein the weighted moving mean includes exponentially decreasing weights.

9. The computer of claim 1, wherein the sensor is one of a global positioning system sensor, an accelerometer, a gyroscope, a radar, a camera, or a LIDAR.

10. The computer of claim 1, wherein the threshold is a value chosen from a chi-square distribution.

11. A method comprising:
receiving a time series of vectors from a sensor of a vehicle;
determining a weighted moving mean of the vectors over at least a portion of the time series;
determining an inverse covariance matrix of the vectors;
receiving a current vector from the sensor;
determining a squared Mahalanobis distance between the current vector and the weighted moving mean, wherein the squared Mahalanobis distance is determined by using the inverse covariance matrix;
outputting an indicator of an anomaly with the sensor in response to the squared Mahalanobis distance exceeding a threshold; and
operating the vehicle based on the time series of vectors without the indicator of the anomaly and not based on the time series of vectors with the indicator of the anomaly.

12. The method of claim 11, wherein the sensor is a first sensor, the method further comprising running a Kalman filter on vectors from a plurality of sensors including the first sensor, and preventing the Kalman filter from receiving the vectors from the first sensor in response to outputting the indicator of the anomaly.

13. The method of claim 12, wherein running the Kalman filter includes, when the Kalman filter is prevented from receiving the vectors from the first sensor, performing an iteration of the Kalman filter with a prediction step and without a measurement step.

14. The method of claim 12, wherein the vectors describe at least one of motion, position, and orientation of the vehicle relative to an external environment.

15. The method of claim 14, further comprising operating at least one of a propulsion, brake system, and steering system of the vehicle based on an output of the Kalman filter.

16. The method of claim 11, wherein the inverse covariance matrix is weighted favoring recency of the vectors.

17. The method of claim 16, wherein the inverse covariance matrix includes exponentially decreasing weights.

18. The method of claim 11, wherein the weighted moving mean includes exponentially decreasing weights.

19. The method of claim 11, wherein the sensor is one of a global positioning system sensor, an accelerometer, a gyroscope, a radar, a camera, or a LIDAR.

20. The method of claim 11, wherein the threshold is a value chosen from a chi-square distribution.

* * * * *